United States Patent
Yang et al.

(10) Patent No.: US 12,542,288 B2
(45) Date of Patent: Feb. 3, 2026

(54) FUEL CELL MEMBRANE HUMIDIFIER AND FUEL CELL SYSTEM HAVING SAME

(71) Applicant: KOLON INDUSTRIES, INC., Seoul (KR)

(72) Inventors: Hyoung Mo Yang, Seoul (KR); Kyoung Ju Kim, Seoul (KR); Woong Jeon Ahn, Seoul (KR); In Ho Kim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 637 days.

(21) Appl. No.: 17/761,200

(22) PCT Filed: Aug. 30, 2021

(86) PCT No.: PCT/KR2021/011612
§ 371 (c)(1),
(2) Date: Mar. 17, 2022

(87) PCT Pub. No.: WO2022/055166
PCT Pub. Date: Mar. 17, 2022

(65) Prior Publication Data
US 2022/0376281 A1    Nov. 24, 2022

(30) Foreign Application Priority Data

Sep. 14, 2020   (KR) .................. 10-2020-0117995
Sep. 14, 2020   (KR) .................. 10-2020-0117996

(51) Int. Cl.
*H01M 8/04119*    (2016.01)
*B01D 63/02*    (2006.01)
*H01M 8/04029*    (2016.01)

(52) U.S. Cl.
CPC ...... *H01M 8/04134* (2013.01); *B01D 63/031* (2022.08); *H01M 8/04029* (2013.01)

(58) Field of Classification Search
CPC ............... B01D 63/031; B01D 63/085; B01D 2313/086; B01D 2313/20; B01D 2313/21;
(Continued)

(56) References Cited

U.S. PATENT DOCUMENTS 7,867,659 B2    1/2011   Jeon
10,804,550 B2   10/2020  Kim
(Continued)

FOREIGN PATENT DOCUMENTS

CN    101383422 A    3/2009
CN    103306868 A    9/2013
(Continued)

OTHER PUBLICATIONS

KR101724454B1, Kim, et al. "Fuel cell system and humidification device of the same", machine English translation retrieved from https://worldwide.espacenet.com/ Date: Nov. 18, 2024 (Year: 2017).*
(Continued)

*Primary Examiner* — Tiffany Legette
*Assistant Examiner* — Jared Hansen
(74) *Attorney, Agent, or Firm* — Harvest IP Law, LLP

(57) ABSTRACT

Proposed are a fuel cell membrane humidifier and a fuel cell system having the same in which humidification by moisture exchange and cooling by heat exchange are performed in one membrane humidifier such that the fuel cell system can be simplified and be miniaturized. The fuel cell membrane humidifier includes a housing part having a space divided by a partition, a humidification module formed in a first portion of the divided space and having a plurality of hollow fiber membranes allowing a first fluid flowing thereinside to perform moisture exchange with a second fluid flowing thereoutside, a heat exchange module formed in a second portion of the divided space and configured to cool a first fluid flowing inside the heat exchange module, and a flow (Continued)

control part configured to actively control a flow direction of the first fluid.

3 Claims, 12 Drawing Sheets

(58) Field of Classification Search
CPC ......... B01D 2313/22; B01D 2313/221; H01M 8/04029; H01M 8/04126; H01M 8/04134; H01M 8/04141; H01M 8/04149; Y02E 60/50
See application file for complete search history.

(56) References Cited

U.S. PATENT DOCUMENTS

| | | | |
|---|---|---|---|
| 11,469,428 B2 | 10/2022 | An | |
| 11,831,047 B2 | 11/2023 | Kim | |
| 2002/0175010 A1* | 11/2002 | Kobayashi | B60L 58/33 180/65.31 |
| 2002/0182474 A1* | 12/2002 | Saito | H01M 8/04119 429/413 |
| 2005/0221149 A1 | 10/2005 | Matsubayashi | |
| 2007/0218340 A1 | 9/2007 | Akiyama | |
| 2013/0233283 A1 | 9/2013 | Rinke | |
| 2015/0004504 A1 | 1/2015 | Bardeleben | |

FOREIGN PATENT DOCUMENTS

| | | | | |
|---|---|---|---|---|
| CN | 110854409 A | | 2/2020 | |
| CN | 111527634 A | | 8/2020 | |
| DE | 102016119440 A1 | * | 4/2018 | |
| JP | 2001250576 A | | 9/2001 | |
| JP | 2006007007 A | * | 1/2006 | |
| JP | 2007042496 A | * | 2/2007 | |
| JP | 2008108473 A | | 5/2008 | |
| JP | 2008-262752 A | | 10/2008 | |
| JP | 2014013733 A | | 1/2014 | |
| KR | 19990038278 U | * | 10/1999 | |
| KR | 2006-0044904 A | | 5/2006 | |
| KR | 20090013304 A | | 2/2009 | |
| KR | 10-2009-0025668 A | | 3/2009 | |
| KR | 20090025668 A | | 3/2009 | |
| KR | 20090057773 A | | 6/2009 | |
| KR | 20090128005 A | | 12/2009 | |
| KR | 20100108092 A | | 10/2010 | |
| KR | 20100131631 A | | 12/2010 | |
| KR | 20110001022 A | | 1/2011 | |
| KR | 20110006122 A | | 1/2011 | |
| KR | 20110006128 A | | 1/2011 | |
| KR | 20110021217 A | | 3/2011 | |
| KR | 20110026696 A | | 3/2011 | |
| KR | 20110063366 A | | 6/2011 | |
| KR | 101134428 B1 | | 4/2012 | |
| KR | 20120124666 A | | 11/2012 | |
| KR | 1020130003110 A | | 1/2013 | |
| KR | 20150072666 A | | 6/2015 | |
| KR | 20150113503 A | * | 10/2015 | ........ H01M 8/04126 |
| KR | 101724454 B1 | * | 4/2017 | |
| KR | 20190035002 A | | 4/2019 | |
| WO | 2008000001 A1 | | 1/2008 | |
| WO | 2020/180169 A1 | | 9/2020 | |
| WO | 2020180169 A | | 9/2020 | |

OTHER PUBLICATIONS

DE102016119440A1, Rebinger, et al. "Radiator assembly for a fuel cell vehicle", machine English translation retrieved from https://worldwide.espacenet.com/ Date: Nov. 18, 2024 (Year: 2018).*
KR20190035002A, An, et al. "Hollow fiber membrane module with hollow fiber membrane of different material and fuel cell membrane humidifier comprising thereof", machine English translation retrieved from https://worldwide.espacenet.com/ Date: Nov. 18, 2024 (Year: 2019).*
KR19990038278U, Park, et al. "Flow control valve", machine English translation retrieved from PE2E Date: Mar. 20, 2025 (Year: 1999).*
JP2006007007A, Otta, et al. "Microreactor", machine English translation retrieved from https://worldwide.espacenet.com/ Date: Mar. 20, 2025 (Year: 2006).*
JP2007042496A, Doi, "Fuel Cell", machine English translation retrieved from https://worldwide.espacenet.com/ Date: Oct. 23, 2025 (Year: 2007).*
KR20150113503A, Kim, et al. "Fluid exchange membrane module", machine English translation retrieved from https://worldwide.espacenet.com/ Date: Oct. 23, 2025 (Year: 2015).*
International Search Report dated Dec. 24, 2021.
The Office Action dated Oct. 19, 2023 related to the corresponding Korean Patent Application No. 10-2020-0117995.
The Office Action dated Oct. 19, 2023 related to the corresponding Korean Patent Application No. 10-2020-0117996.
The Office Action dated Oct. 24, 2023 related to the corresponding Chinese Patent Application No. 202180006532.4.
Notice of Allowance dated Jun. 2, 2024.
European Search Report dated Jan. 19, 2024.
Office Action From European Patent Office Dated Oct. 18, 2025.

* cited by examiner

… (1) …

FUEL CELL MEMBRANE HUMIDIFIER AND FUEL CELL SYSTEM HAVING SAME

CROSS REFERENCE TO RELATED APPLICATION(S)

This application is a National Stage of International Application No. PCT/KR2021/011612 filed Aug. 30, 2021, claiming priority to Korean Patent Application No. 10-2020-0117995 filed Sep. 14, 2020 and Korean Patent Application No. 10-2020-0117996 filed Sep. 14, 2020, the disclosures of which are incorporated herein by reference in its entirety.

TECHNICAL FIELD

The present disclosure relates, in general, to a fuel cell membrane humidifier and a fuel cell system having the same and, more particularly, to a fuel cell membrane humidifier and a fuel cell system having the same in which humidification by moisture exchange and cooling by heat exchange are performed in one membrane humidifier such that the fuel cell system can be simplified and be miniaturized.

BACKGROUND ART

A fuel cell is a power generation type battery that produces electricity by combining hydrogen and oxygen. Unlike general chemical cells such as dry cells and storage batteries, the fuel cell can continuously produce electricity as long as hydrogen and oxygen are supplied thereto, and has the advantage of being twice as efficient as an internal combustion engine because there is no heat loss in the fuel cell.

In addition, the fuel cell directly converts chemical energy generated by the combination of hydrogen and oxygen into electrical energy, and thus is low in the amount of the emission of pollutants. Accordingly, the fuel cell is not only environmentally friendly, but also has the advantage of reducing concerns about resource depletion due to increased energy consumption.

Depending on the type of electrolyte used, such a fuel cell may be largely divided into a polymer electrolyte membrane fuel cell (PEMFC), a phosphoric acid fuel cell (PAFC), a molten carbonate fuel cell (MCFC), a solid oxide fuel cell (SOFC), and an alkaline fuel cell (AFC).

Each of these fuel cells operates on the same principle, but differs in the type of used fuel, an operating temperature, a catalyst, electrolyte, and the like. Among the fuel cells, a polymer electrolyte membrane fuel cell (PEMFC) operates at a lower temperature compared to other fuel cells and has a high output density to enable miniaturization, and thus is known to be the most promising in transport systems as well as small-scale stationary power generation equipment.

One of the most important factors in improving the performance of a polymer electrolyte membrane fuel cell (PEMFC) is to supply a predetermined amount of moisture to a polymer electrolyte membrane or proton exchange membrane (PEM) of a membrane electrode assembly (MEA) so as to maintain moisture content. This is because when the polymer electrolyte membrane dries, the power generation efficiency of the fuel cell decreases rapidly.

The method of humidifying a polymer electrolyte membrane includes 1) a bubbler humidification method in which after filling a pressure vessel with water, target gas is passed through the pressure vessel by a diffuser so as to supply moisture to the pressure vessel, 2) a direct injection method in which the amount of supplied moisture required for fuel cell reaction is calculated and the moisture is supplied directly to a gas flow pipe through a solenoid valve, and 3) a membrane humidification method in which moisture is supplied to the flowing layer of gas by using a polymer membrane.

Among the methods, the membrane humidification method of humidifying a polymer electrolyte membrane by providing water vapor to air supplied to the polymer electrolyte membrane by using a membrane which only water vapor contained in off-gas selectively penetrates is advantageous in that the membrane humidification method can reduce the weight and size of a humidifier.

The selective penetration membrane used in the membrane humidification method is preferably a hollow fiber membrane having a large penetration area per unit volume when forming a module. That is, when a humidifier is manufactured by using the hollow fiber membrane, the hollow fiber membrane with a large contact surface area can be highly integrated and thus can sufficiently perform the humidification of the fuel cell with a small capacity, and can use low-cost materials, and can recover moisture and heat contained in unreacted gas discharged at high temperature from the fuel cell to be reused through the humidifier.

Meanwhile, in a fuel cell system, high temperature dry air generated by a compressor or a blower is introduced through a membrane humidifier into a fuel cell stack. In this case, the high temperature dry air undergoes heat exchange through a heat exchange device such as an air cooler to suit the operation condition of the fuel cell stack, and then is humidified through the membrane humidifier and supplied to the fuel cell stack.

Currently, the heat exchange device and the membrane humidifier are arranged in series for the heat exchange and humidification (moisture control). This requires the installation of an additional air cooler between the membrane humidifier and the blower.

However, the air cooler is disadvantageous for package application because of a large volume thereof, and increases the pressure loss of air compressed by the blower, and additionally requires a coolant flow path, so the air cooler has a problem in that the air cooler has complicated equipment and is disadvantageous in terms of miniaturization.

DISCLOSURE

Technical Problem

The present disclosure is intended to propose a fuel cell membrane humidifier and a fuel cell system having the same in which humidification by moisture exchange and cooling by heat exchange are performed in one membrane humidifier such that the fuel cell system can be simplified and be miniaturized.

Technical Solution

A fuel cell membrane humidifier according to an embodiment of the present disclosure includes: a housing part having a space divided by a partition; a humidification module formed in a first portion of the divided space and having a plurality of hollow fiber membranes allowing a first fluid flowing thereinside to perform moisture exchange with a second fluid flowing thereoutside; a heat exchange module formed in a second portion of the divided space and configured to cool a first fluid flowing inside the heat exchange module; and a flow control part configured to actively control a flow direction of the first fluid according to temperature change of the first fluid according to an output state of a fuel cell stack.

In the fuel cell membrane humidifier according to an embodiment of the present disclosure, the flow control part may be a bimetal composed of a metal plate on a side of the humidification module made of metal having a high coefficient of thermal expansion, and a metal plate on a side of the heat exchange module made of metal having a low coefficient of thermal expansion.

In the fuel cell membrane humidifier according to an embodiment of the present disclosure, the flow control part may further include an opening/closing window formed by being fixed to an end part of the bimetal and configured to open and close a flow path of each of the humidification module and the heat exchange module according to change of a shape of the bimetal.

In the fuel cell membrane humidifier according to an embodiment of the present disclosure, the housing part may include: a housing body divided into two spaces by the partition, and housing caps coupled respectively to opposite ends of the housing body, wherein a first fluid inlet through which the first fluid is introduced and a first fluid outlet through which the first fluid is discharged are formed on the housing caps, respectively, wherein the housing cap on which the first fluid inlet is formed may include the flow control part which controls the flow direction of the first fluid, and a cap partition formed in an extending direction of the partition.

In the fuel cell membrane humidifier according to an embodiment of the present disclosure, the housing part may include: the housing body divided into two spaces by the partition, wherein the first fluid inlet through which the first fluid is introduced and the first fluid outlet through which the first fluid is discharged are formed on the housing body, and the housing caps coupled respectively to opposite ends of the housing body, wherein a second fluid inlet through which the second fluid is introduced and a second fluid outlet through which the second fluid is discharged may be formed on the housing caps, respectively, wherein the housing body may include an extended partition formed by extending in a direction toward the first fluid inlet.

In the fuel cell membrane humidifier according to an embodiment of the present disclosure, the housing part may include: the housing body divided into two spaces by the partition, wherein the first fluid inlet through which the first fluid is introduced and the first fluid outlet through which the first fluid is discharged are formed together on one surface of the housing body, and the housing caps coupled respectively to opposite ends of the housing body, wherein the second fluid inlet through which the second fluid is introduced and the second fluid outlet through which the second fluid is discharged are formed on the housing caps, respectively, wherein the housing body may include an extended partition formed by extending in a direction toward each of the first fluid inlet and the first fluid outlet, and a cross partition formed between the first fluid inlet and the first fluid outlet in a direction intersecting with the extended partition.

In the fuel cell membrane humidifier according to an embodiment of the present disclosure, the heat exchange module may be a heat exchange module of a shell and tube type, a heat exchange module of a honeycomb type, or a heat exchange module of a plate type.

In the fuel cell membrane humidifier according to an embodiment of the present disclosure, the housing part may include: a cooling medium inlet through which a cooling medium is supplied to the heat exchange module, and a cooling medium outlet through which a cooling medium which has performed cooling is discharged, wherein the cooling medium inlet may be connected to a bypass flow path which bypasses at least a portion of outdoor air to be introduced into an air compression means.

The fuel cell system according to an embodiment of the present disclosure includes: the air compression means which receives and compresses outdoor air to generate a first fluid; the fuel cell stack which causes reaction between hydrogen and oxygen to generate a second fluid of heat and high humidity; and the fuel cell membrane humidifier including: the humidification module which humidifies the first fluid by using moisture exchange between the first fluid compressed by the air compression means and the second fluid discharged from the fuel cell stack; the heat exchange module which cools the first fluid; and the flow control part which actively controls a flow direction of the first fluid according to temperature change of the first fluid according to an output state of the fuel cell stack.

In the fuel cell system according to an embodiment of the present disclosure, the flow control part may be the bimetal composed of a metal plate on a side of the humidification module made of metal having a high coefficient of thermal expansion, and a metal plate on a side of the heat exchange module made of metal having a low coefficient of thermal expansion.

In the fuel cell system according to an embodiment of the present disclosure, the flow control part may further include the opening/closing window formed by being fixed to an end part of the bimetal and configured to open and close a flow path of each of the humidification module and the heat exchange module according to change of a shape of the bimetal.

In the fuel cell system according to an embodiment of the present disclosure, the fuel cell membrane humidifier may include the housing part having space divided by the partition, the humidification module may be formed in the first portion of the divided space and having the plurality of hollow fiber membranes allowing the first fluid flowing thereinside to perform the moisture exchange with the second fluid flowing thereoutside, and the heat exchange module may be formed in the second portion of the divided space and cool a first fluid flowing inside the heat exchange module.

In the fuel cell system according to an embodiment of the present disclosure, the housing part may include: the housing body divided into two spaces by the partition, and the housing caps coupled respectively to opposite ends of the housing body, wherein the first fluid inlet through which the first fluid is introduced and the first fluid outlet through which the first fluid is discharged may be formed on the housing caps, respectively, wherein the housing cap on which the first fluid inlet is formed may include the flow control part which controls the flow direction of the first fluid, and the cap partition formed in an extending direction of the partition.

In the fuel cell system according to an embodiment of the present disclosure, the housing part may include: the housing body divided into two spaces by the partition, wherein the first fluid inlet through which the first fluid is introduced and the first fluid outlet through which the first fluid is discharged may be formed on the housing body, and the housing caps coupled respectively to opposite ends of the housing body, wherein the second fluid inlet through which the second fluid is introduced and the second fluid outlet through which the second fluid is discharged may be formed on the housing caps, respectively, wherein the housing body may include the extended partition formed by extending in a direction toward the first fluid inlet.

In the fuel cell system according to an embodiment of the present disclosure, the housing part may include: the housing body divided into two spaces by the partition, wherein the first fluid inlet through which the first fluid is introduced and the first fluid outlet through which the first fluid is discharged may be formed together on one surface of the housing body, and the housing caps coupled respectively to opposite ends of the housing body, wherein the second fluid inlet through which the second fluid is introduced and the second fluid outlet through which the second fluid is discharged may be formed on the housing caps, respectively, wherein the housing body may include the extended partition formed by extending in a direction toward each of the first fluid inlet and the first fluid outlet, and the cross partition formed between the first fluid inlet and the first fluid outlet in a direction intersecting with the extended partition.

In the fuel cell system according to an embodiment of the present disclosure, the housing part may include: the cooling medium inlet through which a cooling medium is supplied to the heat exchange module, and the cooling medium outlet through which a cooling medium which has performed cooling is discharged, wherein the cooling medium inlet may be connected to the bypass flow path which bypasses at least a portion of outdoor air to be introduced into the air compression means.

Other details of embodiments according to various aspects of the present disclosure are included in detailed description below.

Advantageous Effects

According to the embodiment of a fuel cell membrane humidifier and a fuel cell system having the same of the present disclosure, humidification by moisture exchange and cooling by heat exchange are performed in one membrane humidifier such that the fuel cell system can be simplified and be miniaturized.

MODE FOR INVENTION

The present disclosure may be variously changed and may have various embodiments, but specific embodiments will be illustrated and described in detail in the present disclosure. However, this is not intended to limit the present disclosure to the specific embodiments, and the specific embodiments should be understood to include all conversions, equivalents or substitutes included in the spirit and technical scope of the present disclosure.

Terms used in the present disclosure are only used to describe the specific embodiments, and are not intended to limit the present disclosure. The singular expression of each of the terms includes the plural expression thereof unless clearly stated otherwise in the context. In the present disclosure, terms such as "include" or "have" are intended to designate that a feature, number, step, operation, component, part, or combination thereof described in the specification exists, and should be understood not to preclude the possibility of the existence or addition of one or more other features or numbers, steps, operations, components, parts, or combinations thereof. Hereinafter, a fuel cell membrane humidifier and a fuel cell system having the same will be described with reference to the accompanying drawings.

Figure 1:
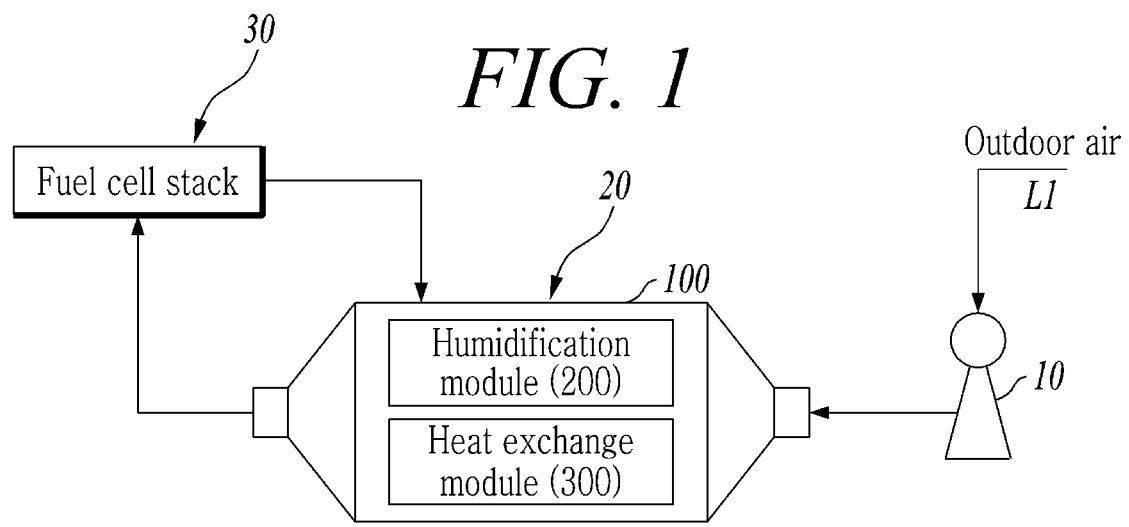
FIG. 1 is a view illustrating a fuel cell system having a fuel cell membrane humidifier according to a first embodiment of the present disclosure.

FIG. 1 is a view illustrating the fuel cell system having a fuel cell membrane humidifier according to a first embodiment of the present disclosure. As illustrated in FIG. 1, the fuel cell system according to the first embodiment of the present disclosure includes an air compression means 10, the fuel cell membrane humidifier 20, and a fuel cell stack 30.

The air compression means 10 receives and compresses outdoor air from an outdoor air supply path L1 and supplies the compressed air to the fuel cell membrane humidifier 20.

The air compression means 10 is a device for compressing a fluid such as air and may be, for example, a blower or a compressor.

The fuel cell membrane humidifier 20 is supplied with hot dry air compressed by the air compression means 10. Furthermore, the fuel cell membrane humidifier 20 is supplied with high-temperature and high-humidity gas discharged from the fuel cell stack 30.

In a humidification module 200 of the fuel cell membrane humidifier 20, moisture exchange between at least a portion of dry air compressed by the air compression means 10 (all or no dry air depending on the operation condition of the fuel cell membrane humidifier) and high-humidity gas discharged from the fuel cell stack 30 is performed. As a result of the moisture exchange, the dry air is supplied to the fuel cell stack 30 while containing moisture.

Depending on the operation condition, at least a portion of dry air compressed by the air compression means 10 (all or no dry air depending on the operation condition) is not humidified in the humidification module 200 but exchanges only heat with a heat exchange module 300 while passing through the heat exchange module 300, and after high temperature dry air is changed to low temperature dry air, the low temperature dry air is mixed with humidified air that has passed through the humidification module 200 and may be supplied to the fuel cell stack 30. Reference numeral 100 indicates a housing part.

The fuel cell stack 30 is configured as an electricity generating assembly in which multiple unit cells are continuously arranged, and each of the unit cells is provided as a unit fuel cell that generates electric energy by an electrochemical reaction of hydrogen and air. Each of the unit cells includes a membrane electrode assembly, and a separator disposed to be in close contact with each of the opposite sides of the membrane electrode assembly. The separator is configured to have the form of a conductive plate, and forms a channel for moving fuel and air to the close contact surface of the membrane electrode assembly. The membrane electrode assembly has an anode formed on a first surface thereof and a cathode formed on a second surface thereof, and is configured to have an electrolyte membrane formed between the anode and the cathode.

The anode oxidizes hydrogen supplied through the channel of the separator to separate electrons and hydrogen ions from each other, and the electrolyte membrane functions to move the hydrogen ions to the cathode. Furthermore, the cathode functions to deoxidize the electrons and hydrogen ions received from the anode, and oxygen in air supplied through the channel of the separator so as to generate water and heat. High-humidity exhaust gas resulting from reaction between hydrogen and oxygen is supplied from the fuel cell stack 30 to the fuel cell membrane humidifier 20.

In such a fuel cell system according to the first embodiment of the present disclosure, the humidification module 200 and the heat exchange module 300 for heat exchange are located inside one housing part 100 for moisture exchange and are integrated with each other in a parallel manner, thereby simplifying the fuel cell system and miniaturizing the fuel cell system.

Hereinafter, the fuel cell membrane humidifier 20 according to the first embodiment of the present disclosure will be described with reference to FIGS. 2 to 8.

Figure 2:
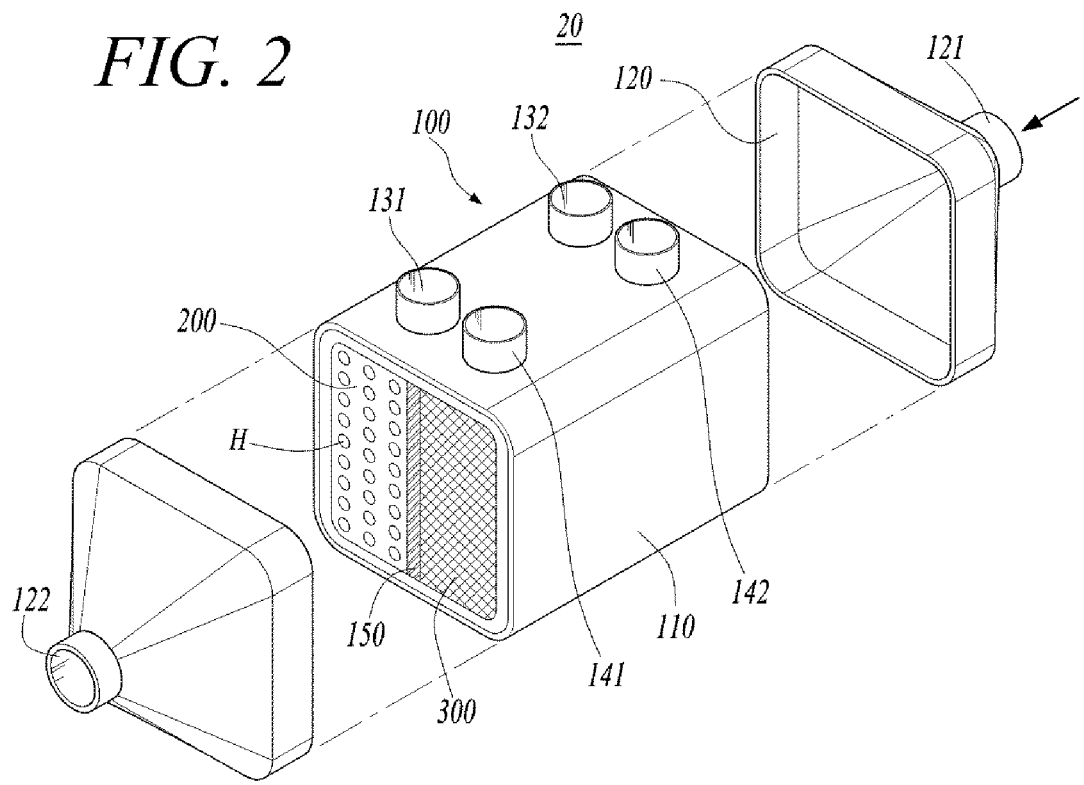
FIG. 2 is a perspective view illustrating the fuel cell membrane humidifier according to the first embodiment of the present disclosure.
Figure 3:
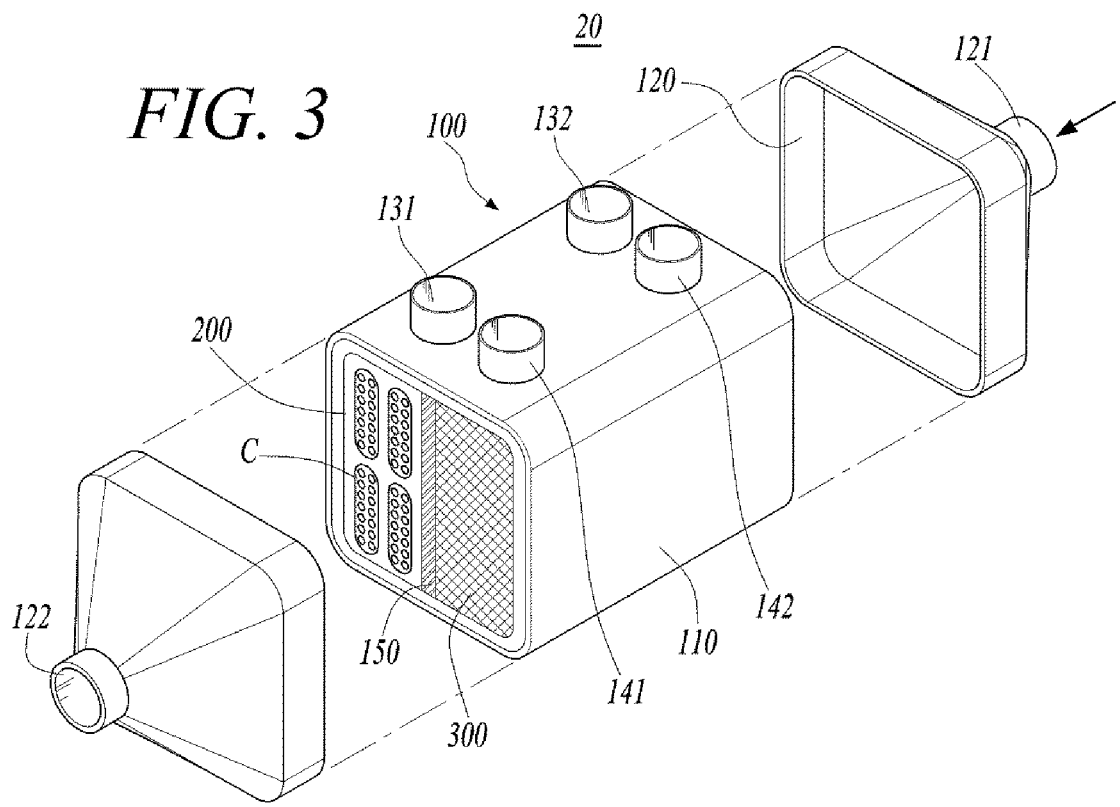
FIG. 3 is a perspective view illustrating an applied example of the fuel cell membrane humidifier according to the first embodiment of the present disclosure.
Figure 4:
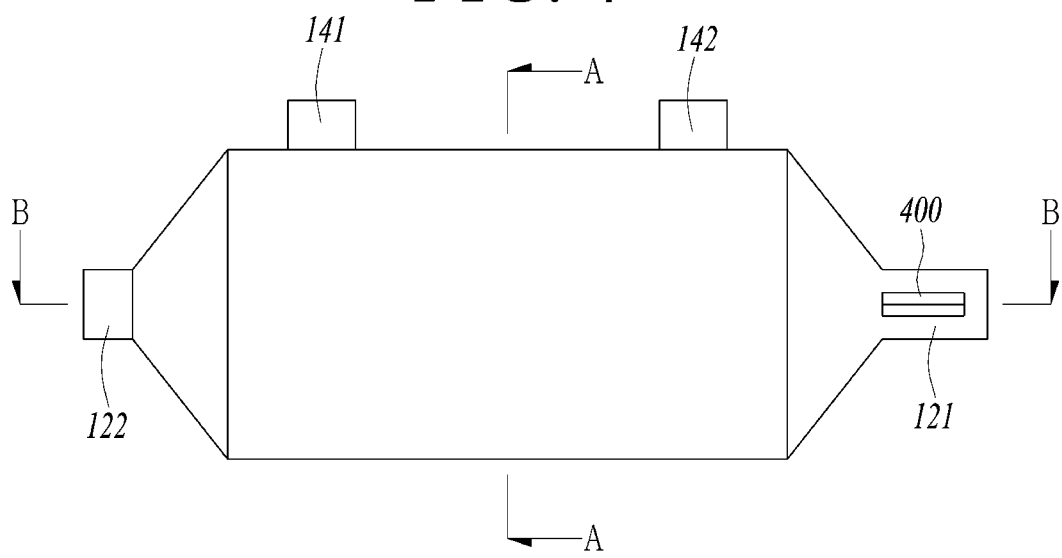
FIG. 4 is a front view illustrating the fuel cell membrane humidifier according to the first embodiment of the present disclosure.
Figure 5:
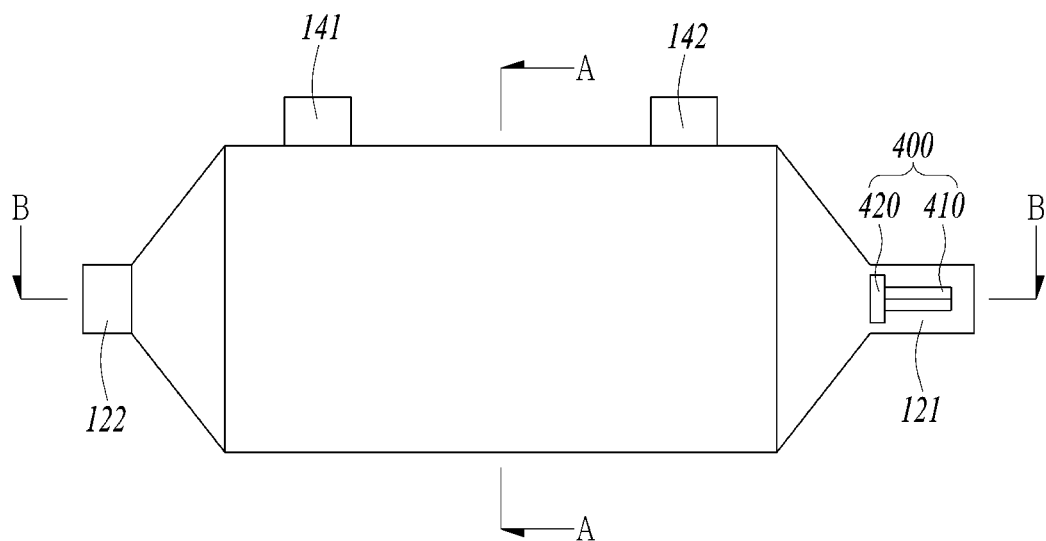
FIG. 5 is a front view illustrating a fuel cell membrane humidifier according to a modified example of the first embodiment of the present disclosure.
Figure 6:
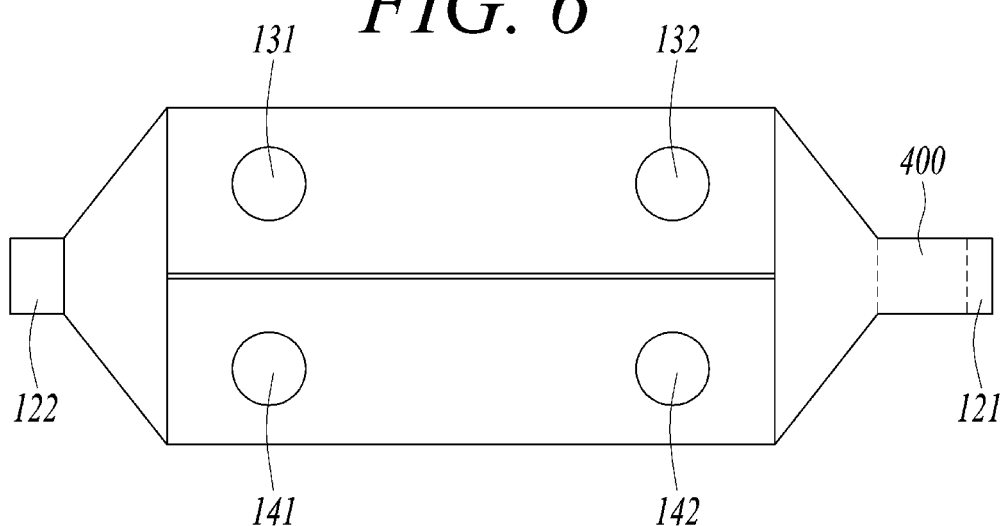
FIG. 6 is a top plan view illustrating the fuel cell membrane humidifier according to the first embodiment of the present disclosure.
Figure 7:
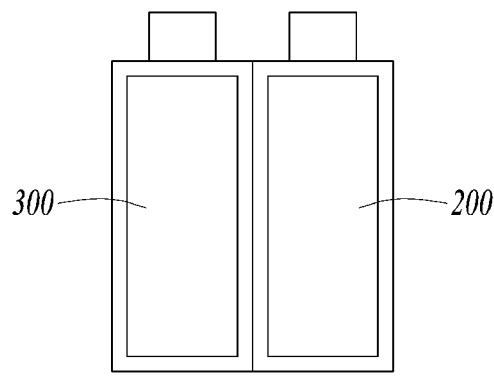
FIG. 7 is a cross-sectional view taken along line A-A of FIG. 4.
Figure 8:
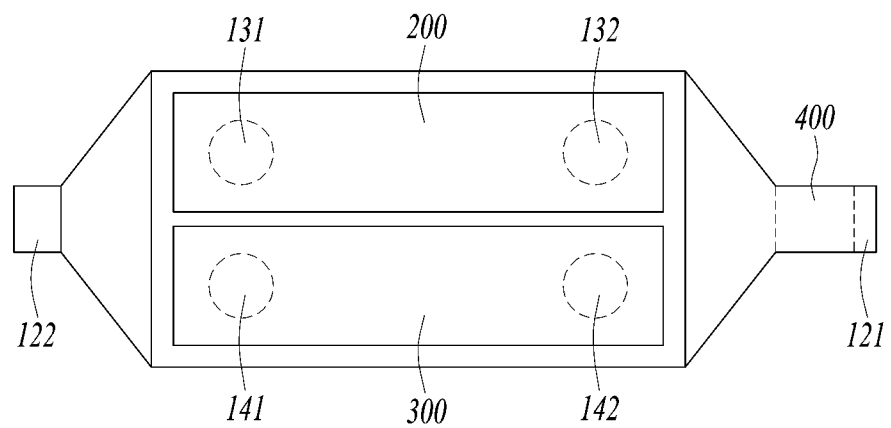
FIG. 8 is a cross-sectional view taken along line B-B of FIG. 4.

FIG. 2 is a perspective view illustrating the fuel cell membrane humidifier according to the first embodiment of the present disclosure, FIG. 3 is a perspective view illustrating an applied example of the fuel cell membrane humidifier according to the first embodiment of the present disclosure, FIG. 4 is a front view illustrating the fuel cell membrane humidifier according to the first embodiment of the present disclosure, FIG. 5 is a front view illustrating a fuel cell membrane humidifier according to a modified example of the first embodiment of the present disclosure, FIG. 6 is a top plan view illustrating the fuel cell membrane humidifier according to the first embodiment of the present disclosure, FIG. 7 is a cross-sectional view taken along line A-A of FIG. 4, and FIG. 8 is a cross-sectional view taken along line B-B of FIG. 4.

As illustrated in FIGS. 2 to 8, the fuel cell membrane humidifier 20 according to the first embodiment of the present disclosure includes the housing part 100, the humidification module 200, the heat exchange module 300, and a flow control part 400.

The housing part 100 constitutes the exterior of the fuel cell membrane humidifier 20. The housing part 100 may include a housing body 110 and housing caps 120 and may be configured as an integrated type coupled therewith. The housing body 110 and each of the housing caps 120 may be made of a rigid plastic such as polycarbonate or metal.

The housing body 110 is divided into two spaces by a partition 150, and the humidification module 200 configured to perform moisture exchange and the heat exchange module 300 configured to perform cooling by heat exchange are disposed respectively in the spaces. (see FIG. 7)

In addition, each of the housing body 110 and the housing cap 120 may have a polygonal or circular shape in a width-direction cross section. The polygonal shape may be a rectangle, square, trapezoid, parallelogram, pentagon, or hexagon, and may also be a shape with rounded corners. Furthermore, the circular shape may be an elliptical shape.

Referring to FIG. 8, a second fluid inlet 131 through which a second fluid is supplied and a second fluid outlet 132 through which the second fluid is discharged are formed on a portion of the housing body 110 in which the humidification module 200 is disposed. A first fluid may be a low-humidity fluid, and the second fluid may be a high-humidity fluid. More specifically, the first fluid may be dry air compressed by the air compression means 10, and the second fluid may be high-humidity gas discharged from the fuel cell stack 30.

A cooling medium inlet 141 through which a cooling medium is supplied and a cooling medium outlet 142 through which a cooling medium which has performed cooling is discharged are formed in a portion of the housing body 110 in which the heat exchange module 300 is disposed. A cooling method by the heat exchange module 300 may be an air cooling type or a water cooling type, and a cooling medium may be air or water supplied from the outside.

The housing cap 120 is coupled to each of the opposite ends of the housing body 110. A first fluid inlet 121 and a first fluid outlet 122 are formed on the housing caps 120, respectively. The flow control part 400 which controls the flow direction of an introduced first fluid is formed in the housing cap 120 on which the first fluid inlet 121 is formed. Furthermore, the housing cap 120 on which the first fluid inlet 121 is formed may include a cap partition 123 (see FIG. 12) formed in the extending direction of the partition 150 formed in the housing body 110. The partition 150 and the cap partition 123 may be formed separately from each other or integrally with each other according to design thereof. The first fluid whose direction is controlled by the flow control part 400 is guided to the humidification module 200 or the heat exchange module 300 by the cap partition 123.

At least a portion of the first fluid introduced into the first fluid inlet 121 is introduced into the humidification module 200, and the remaining portion thereof is introduced into the heat exchange module 300. According to the operation condition, all of the first fluid may be introduced into the humidification module 200 or the heat exchange module 300.

Bundles of hollow fiber membranes in which a plurality of hollow fiber membranes H allowing moisture to pass selectively therethrough is received may be disposed inside the humidification module 200. Alternatively, as illustrated in FIG. 3, a plurality of cartridges C in which the plurality of hollow fiber membranes is received may be disposed inside the humidification module 200. For example, the hollow fiber membranes H may be hollow fiber membranes made of a Nafion material, a polyetherimide material, a polyphenylsulfone material, a polyimide material, a polysulfone material, or a polyester sulfone material. The hollow fiber membranes H have different degrees of moisture exchange, but generally perform the function of exchanging moisture between the first fluid and the second fluid.

A first fluid introduced into the humidification module 200 passes through the pipeline of the inside of each of the hollow fiber membranes and is discharged to the outside of the humidification module 200, and then is mixed with a first fluid passing through the heat exchange module 300 and the mixed first fluid is introduced through the first fluid outlet 122 into the fuel cell stack 30.

A potting part (not shown) is formed on each of the opposite end parts of the humidification module 200, the potting part holding the hollow fiber membranes H and filling a gap between each of the hollow fiber membranes. Accordingly, the opposite end parts of the humidification module 200 are blocked by the potting part and a flow path through which a second fluid passes is formed inside the humidification module. The material of the potting part accords to known technology, and detailed description thereof will be omitted herein.

According to the output state of the fuel cell stack, the flow control part 400 controls the flow direction of a first fluid introduced into each of the humidification module 200 and the heat exchange module 300. The flow control part 400 actively controls the flow direction of the first fluid according to the temperature change of the first fluid according to the high or low output of the fuel cell stack.

To this end, as illustrated in FIG. 4, the flow control part 400 may include a bimetal manufactured in the shape of one rod by superimposing two or more metal plates having different coefficients of thermal expansion.

When the output of the fuel cell stack 30 is a low output, a humidification amount in the fuel cell membrane humidifier 20 is relatively small, and when the output of the fuel cell stack 30 is a high output, a humidification amount in the fuel cell membrane humidifier 20 is relatively large.

In addition, when the output of the fuel cell stack 30 is a low output, a first fluid supplied from the blower to the fuel cell membrane humidifier 20 has relatively low temperature, and, and when the output of the fuel cell stack 30 is a high output, a first fluid supplied from the blower to the fuel cell membrane humidifier 20 has relatively high temperature.

Accordingly, in the flow control part 400, a metal plate on the side of the humidification module 200 may be a metal having a high coefficient of thermal expansion, and a metal plate on the side of the heat exchange module 300 may be a metal having a low coefficient of thermal expansion.

Alternatively, as illustrated in FIG. 5, the flow control part 400 may include a bimetal 410 and an opening/closing window 420. The bimetal 410 may be manufactured to have the shape of one rod by superimposing two or more metal plates having different coefficients of thermal expansion. In the bimetal 410, a metal plate on the side of the humidification module 200 side may be a metal having a high coefficient of thermal expansion, and a metal plate on the side of the heat exchange module 300 may be a metal having a low coefficient of thermal expansion. The opening/closing window 420 is formed by being fixed to an end part of the bimetal 410 and can open and close the flow path of each of the humidification module 200 and the heat exchange module 300 while moving in the first fluid inlet 121 according to the change of the shape of the bimetal 410.

Without having a valve for controlling the flow rate of the first fluid, a sensor for sensing the flow rate of the first fluid, and a controller for controlling the operation of a valve, such a flow control part 400 actively allows a first fluid to flow evenly through the humidification module 200 and the heat exchange module 300, or to flow excessively to one of the humidification module 200 and the heat exchange module 300, or controls such that the first fluid does not flow to one of the humidification module 200 and the heat exchange module 300 according to the output state of the fuel cell stack and may control the flow rate of the first fluid.

Figure 9:
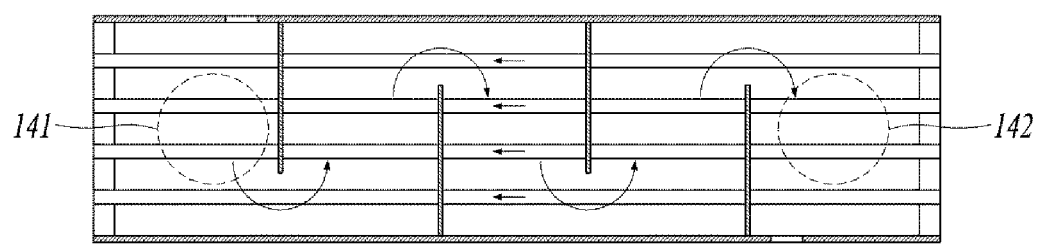
FIG. 9 is a view illustrating a heat exchange module which is the heat exchange module of a shell and tube type.

The heat exchange module 300 will be described with reference to FIGS. 9 to 11. FIG. 9 is a view illustrating a heat exchange module of a shell and tube type, FIG. 10 is a view illustrating a heat exchange module of a honeycomb type, and FIG. 11 is a view illustrating a heat exchange module of a plate type.

The heat exchange module of a shell and tube type illustrated in FIG. 9 is composed of a shell having a bundle of tubes received therein, and when one fluid flows through each of the tubes and another fluid flows through the shell, heat of the fluids is transferred to each other and exchanged therebetween. The tubes may be configured as various types of tubes such as a flat tube and a tube having the shape of a vertical fin.

When at least a portion of a first fluid (a dry air compressed by the air compression means 10) flows through a tube (indicated by a straight arrow), a cooling medium introduced through the cooling medium inlet 141 into the shell flows through the inside of the shell (indicated by a curved arrow) and contacts with the tube and cools the first fluid, and then is discharged through the cooling medium outlet 142 to the outside.

Figure 10:
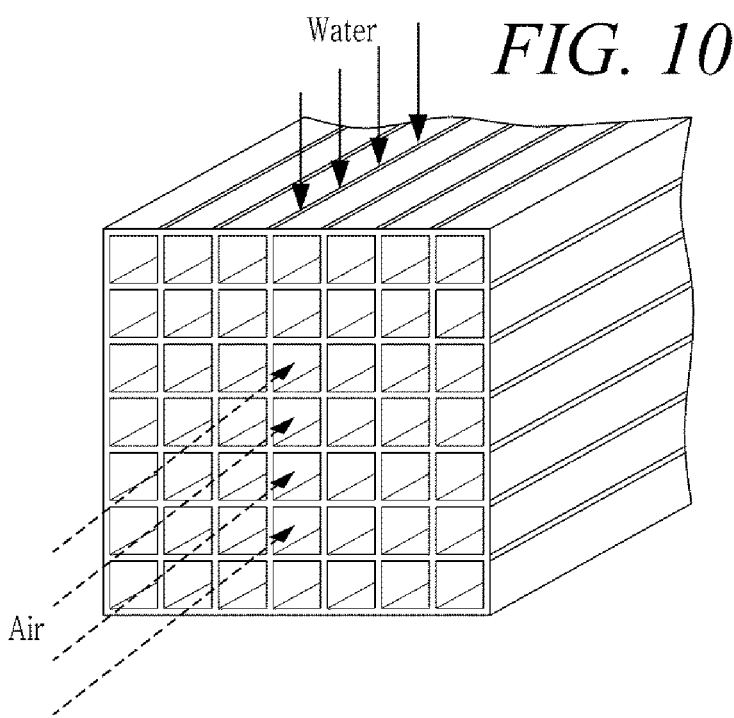
FIG. 10 is a view illustrating a heat exchange module which is the heat exchange module of a honeycomb type.
Figure 11:
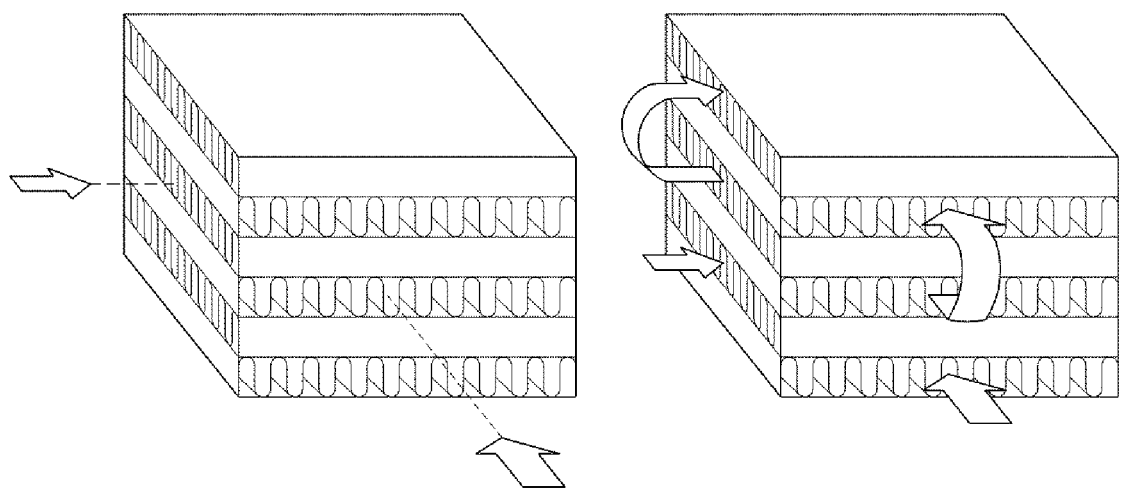
FIG. 11 is a view illustrating a heat exchange module which is the heat exchange module of a plate type.

The heat exchange module of a honeycomb type illustrated in FIG. 10 is a heat exchanger embodied in the form of a honeycomb made of a ceramic material, and when the first fluid (represented by air) flows inside a honeycomb-typed pipeline, a cooling medium (indicated by water) is supplied in a direction intersecting with the pipeline and cools the first fluid.

The heat plates of the heat exchange module of a plate type (a plate heat exchanger) illustrated in FIG. 11 are configured as embossed stainless steel plates and are arranged such that the directions of herringbone patterns of each of the heat plates are in disagreement with each other up and down, whereby fluids are distributed evenly to the heat plates to form turbulence and flow countercurrently to each other so as to exchange heat with a heat source side.

The first fluid introduced into the heat exchange module 300 as described above passes through the inside of the heat exchange device constituting the heat exchange module 300 and is discharged to the outside of the heat exchange module 300, and then is mixed with a first fluid passing through the humidification module 200 and is introduced through the first fluid outlet 122 into the fuel cell stack 30. The heat exchange modules of FIGS. 9 to 11 are only examples for description and are not necessarily limited thereto.

Figure 12:
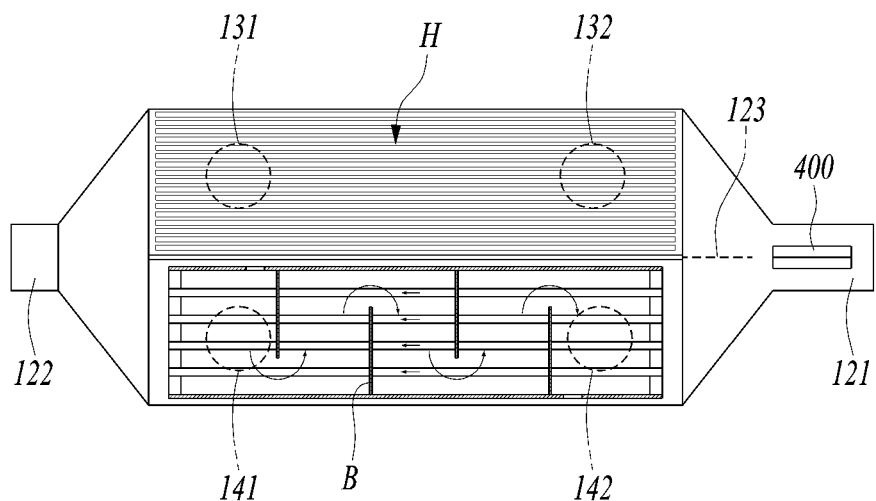
FIG. 12 is a view illustrating the heat exchange module of the shell and tube type of FIG. 9 applied to the fuel cell membrane humidifier according to the first embodiment of the present disclosure.

FIG. 12 is a view illustrating the heat exchange module of the shell and tube type of FIG. 9 applied to the fuel cell membrane humidifier according to the first embodiment of the present disclosure.

Figure 13:
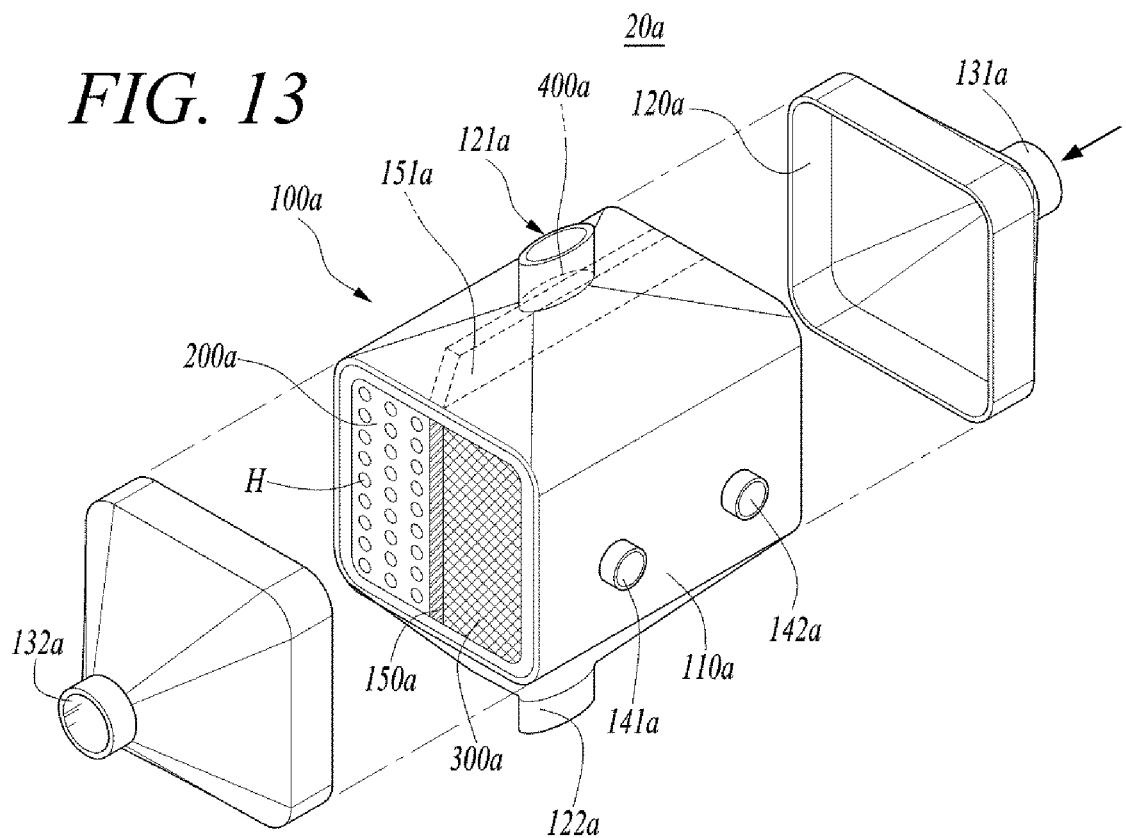
FIG. 13 is a perspective view illustrating a fuel cell membrane humidifier according to a second embodiment of the present disclosure.

Next, a fuel cell membrane humidifier according to a second embodiment of the present disclosure will be described with reference to FIGS. 13 to 15. FIG. 13 is a perspective view illustrating a fuel cell membrane humidifier 20a according to the second embodiment of the present disclosure, FIG. 14 is a side view illustrating the fuel cell membrane humidifier 20a according to the second embodiment of the present disclosure, and FIG. 15 is a perspective view illustrating an applied example of the fuel cell membrane humidifier 20a according to the second embodiment of the present disclosure.

Figure 14:
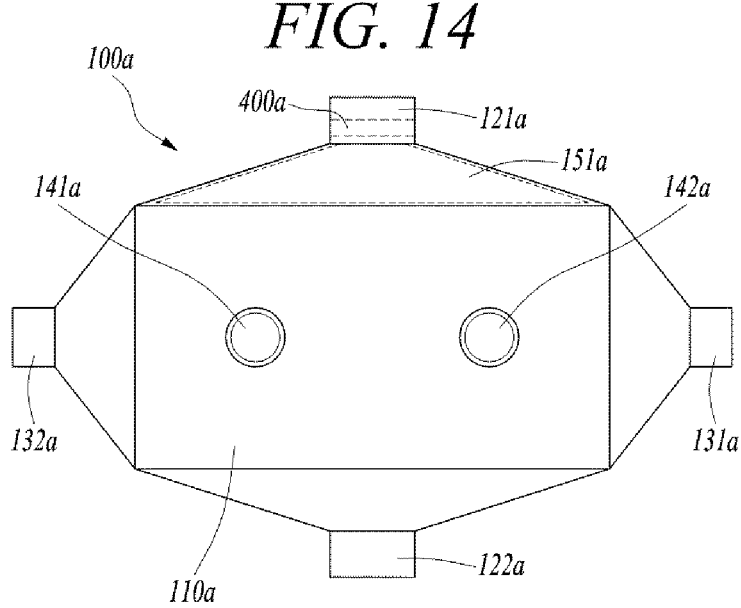
FIG. 14 is a side view illustrating the fuel cell membrane humidifier according to the second embodiment of the present disclosure.
Figure 15:
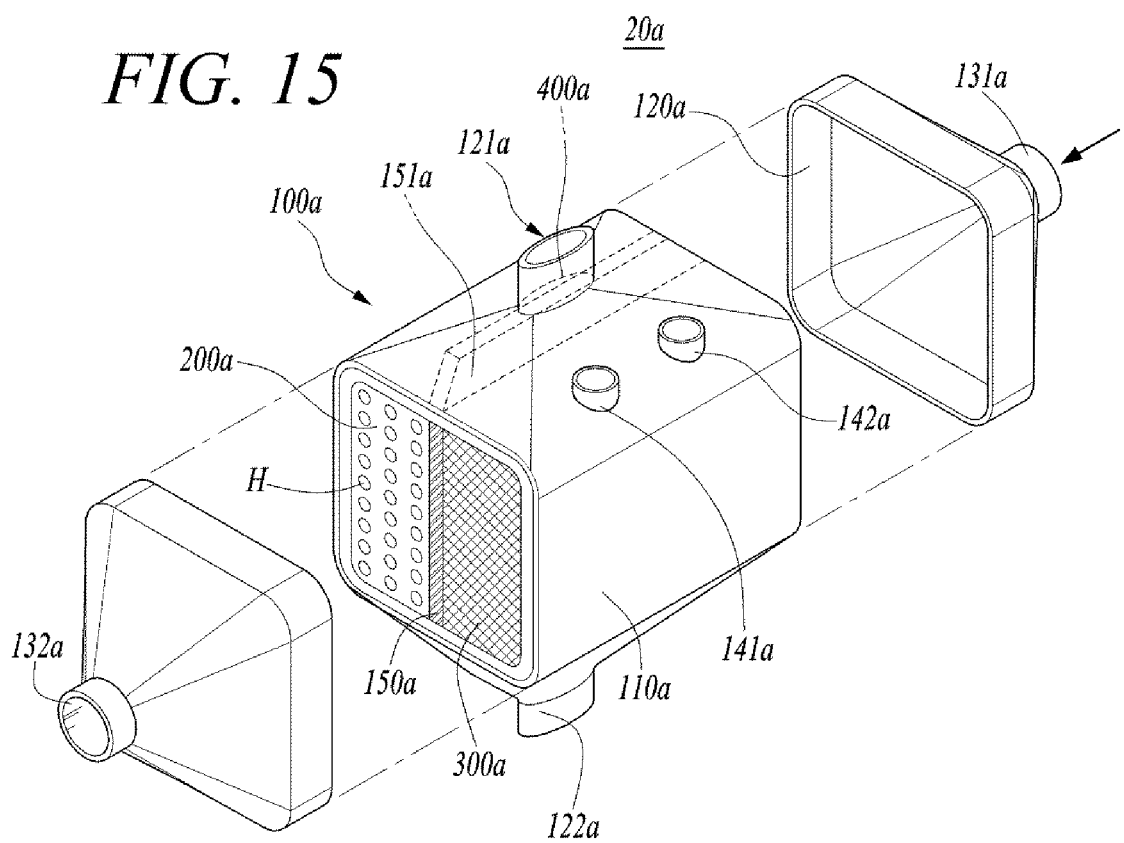
FIG. 15 is a perspective view illustrating an applied example of the fuel cell membrane humidifier according to the second embodiment of the present disclosure.

The fuel cell membrane humidifier illustrated in FIGS. 13 to 15 is substantially similar to the fuel cell membrane humidifier of the first embodiment described above, and is provided with a housing part 100a, a humidification module 200a, a heat exchange module 300a, and a flow control part 400a. In the second embodiment, a high-humidity second fluid flows in and out through housing caps 120a, and a dry (low-humidity) first fluid flows in and out through a housing body 110a.

The housing body 110a is divided into two spaces by a partition 150a, and the humidification module 200a which performs moisture exchange and the heat exchange module 300a which performs cooling by heat exchange are disposed in the two spaces, respectively.

A first fluid inlet 121a through which a first fluid is supplied and a first fluid outlet 122a through which the first fluid is discharged are formed on a portion of the housing body 110a in which the humidification module 200a is disposed. The flow control part 400a which controls the flow direction of an introduced first fluid is formed in the first fluid inlet 121a. Furthermore, the housing body 110a on which the first fluid inlet 121a is formed may include an extended partition 151a formed in such a manner that the partition 150a formed in the housing body 110a is extended in a direction toward the first fluid inlet 121a. The partition 150a and the extended partition 151a may be formed separately from each other or integrally with each other according to design thereof. The first fluid whose direction is controlled by the flow control part 400a is guided to the humidification module 200a or the heat exchange module 300a by the extended partition 151a.

At least a portion of the first fluid introduced into the first fluid inlet 121a is introduced into the humidification module 200a, and the remaining portion thereof is introduced into the heat exchange module 300a. According to the operation condition of the fuel cell membrane humidifier, all of the first fluid may be introduced into the humidification module 200a or the heat exchange module 300a.

A cooling medium inlet 141a through which a cooling medium is supplied and a cooling medium outlet 142a through which the cooling medium which has performed cooling is discharged are formed in a portion of the housing body 110a in which the heat exchange module 300a is disposed. The cooling medium inlet 141a and the cooling medium outlet 142a may be formed on the side surface of the housing body 110a. However, the cooling medium inlet 141a and the cooling medium outlet 142a are not limited thereto, and as illustrated in FIG. 15, the cooling medium inlet 141a and the cooling medium outlet 142a may be formed on the upper or lower surface of the housing body 110a. In this case, in order to move a cooling medium through the heat exchange module 300a, the cooling medium inlet 141a and the cooling medium outlet 142a are formed through the upper or lower surface of the housing body 110a so as to be connected with the heat exchange module 300a.

The housing cap 120a is coupled to each of the opposite ends of the housing body 110a. A second fluid inlet 131a and a second fluid outlet 132a are formed on the housing caps 120a, respectively.

The humidification module 200a and the heat exchange module 300a are the same as the associated modules according to the first embodiment described above, so repeated description thereof will be omitted. Furthermore, the flow control part 400a is only different from the flow control part 400 in that the flow control part 400a is installed in the first fluid inlet 121a, and the function and configuration of the flow control part 400a is substantially the same as the flow control part 400, so repeated description thereof will be omitted.

Figure 16:
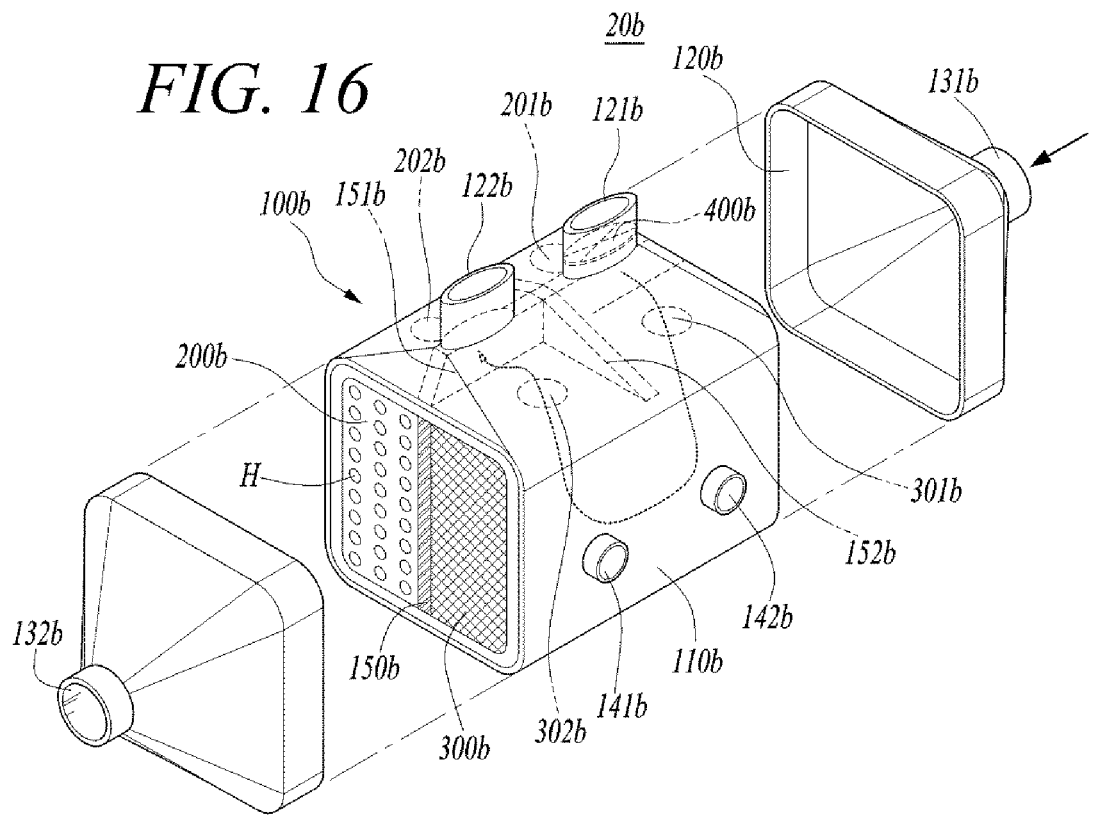
FIG. 16 is a perspective view illustrating a fuel cell membrane humidifier according to a third embodiment of the present disclosure.

Next, a fuel cell membrane humidifier according to a third embodiment of the present disclosure will be described with reference to FIGS. 16 to 18. FIG. 16 is a perspective view illustrating a fuel cell membrane humidifier 20b according to a third embodiment of the present disclosure, FIG. 17 is a top plan view of FIG. 16, and FIG. 18 is a top plan view illustrating a fuel cell membrane humidifier according to a modified example of the third embodiment of the present disclosure.

Figure 17:
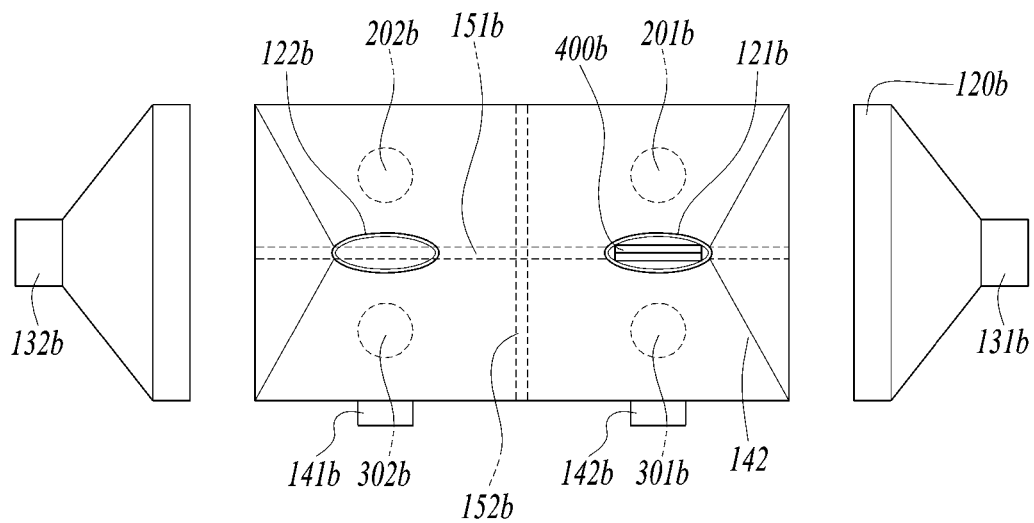
FIG. 17 is a top plan view of FIG. 16.
Figure 18:
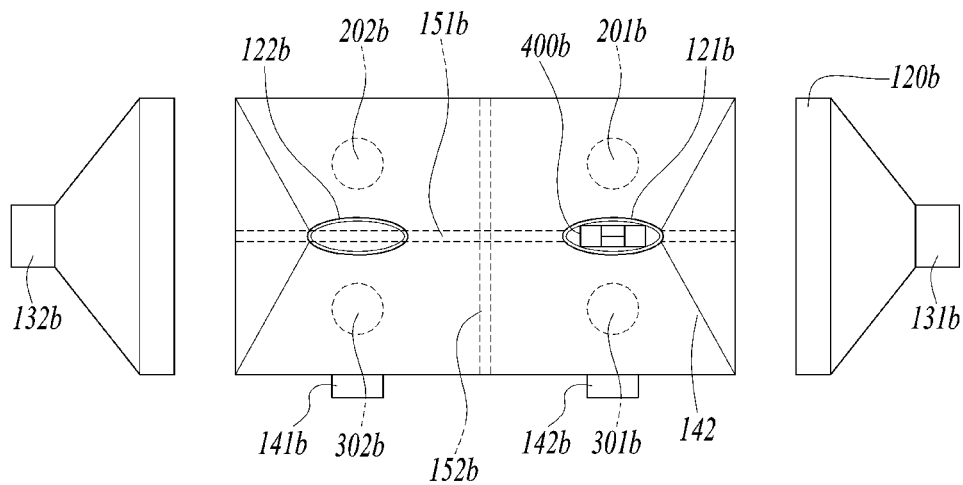
FIG. 18 is a top plan view illustrating a fuel cell membrane humidifier according to a modified example of the third embodiment of the present disclosure.

The fuel cell membrane humidifier illustrated in FIGS. 16 to 18 is substantially similar to the fuel cell membrane humidifier of the second embodiment described above and is provided with a housing part 100b, a humidification module 200b, a heat exchange module 300b, and a flow control part 400b. In the third embodiment, a high-humidity second fluid flows in and out through housing caps 120b, and a dry (low-humidity) first fluid flows in and out through a housing body 110b, and a first fluid inlet 121b and a first fluid outlet 122b are formed together on the upper or lower surface of the housing body 110b.

The housing body 110b is divided into two spaces by a partition 150b, and a humidification module 200b which performs moisture exchange and the heat exchange module 300b which performs cooling by heat exchange are respectively disposed in the two spaces.

The first fluid inlet 121b through which a first fluid is supplied and the first fluid outlet 122b through which the first fluid is discharged are formed on one surface (an upper or lower surface) of the portion of the housing body 110b in which the humidification module 200b is disposed. The flow control part 400b which controls the flow direction of an introduced first fluid is formed in the first fluid inlet 121b. Furthermore, the housing body 110b on which the first fluid inlet 121b and the first fluid outlet 122b are formed may include an extended partition 151b formed in such a manner that the partition 150b formed in the housing body 110b is extended in a direction toward each of the first fluid inlet 121b and the first fluid outlet 122b, and a cross partition 152b formed in a direction intersecting with the extended partition 151b. The cross partition 152b may be formed between the first fluid inlet 121b and the first fluid outlet 122b. The extended partition 151b and the cross partition 152b divide space defined by the humidification module 200b, the heat exchange module 300b, and the housing body 110b into four separated spaces.

A first introduction window 201b which allows a first fluid introduced through the first fluid inlet 121b to be introduced into the humidification module 200b, and a first discharge window 202b which allows a first fluid which has performed moisture exchange while flowing through the inside of the humidification module 200b to be discharged therefrom are formed on one surface (an upper or lower surface) of the humidification module 200b.

In addition, a second introduction window 301b which allows a first fluid introduced through the first fluid inlet 121b to be introduced into the heat exchange module 300b, and a second discharge window 302b which allows a first fluid which has performed heat exchange while flowing through the inside of the heat exchange module 300b to be discharged therefrom are formed on one surface (an upper or lower surface) of the heat exchange module 300b.

Each of the introduction window 201b and the discharge window 202b is formed through a portion of a surface of the humidification module 200b, and each of the introduction window 301b and the discharge window 302b is formed through a portion of a surface of the heat exchange module 300b.

A cooling medium inlet 141b through which a cooling medium is supplied and a cooling medium outlet 142b through which a cooling medium which has performed cooling is discharged are formed on a portion of the housing body 110b in which the heat exchange module 300b is disposed. The cooling medium inlet 141b and the cooling medium outlet 142b may be formed on a side surface of the housing body 110b.

The housing caps 120b are coupled respectively to the opposite ends of the housing body 110b. A second fluid inlet 131b and a second fluid outlet 132b are formed on the housing caps 120b, respectively.

The humidification module 200b and the heat exchange module 300b are the same as the associated modules of the first embodiment described above, so repeated description thereof will be omitted. Furthermore, the flow control part 400b is only different from the flow control part 400 in that the flow control part 400b is installed in the first fluid inlet 121b, and the function and configuration of the flow control part 400b is substantially the same as the flow control part 400, so repeated description thereof will be omitted. FIG. 17 illustrates a case in which the flow control part 400b includes only the bimetal, and FIG. 18 illustrates a case in which the flow control part 400b includes the bimetal 410 and the opening/closing window 420.

The first fluid whose direction is controlled by the flow control part 400b is guided to the humidification module 200b or the heat exchange module 300b by the extended partition 151b.

At least a portion of a first fluid introduced into the first fluid inlet 121b is introduced through the first introduction window 201b into the humidification module 200b, and the remaining portion thereof is introduced through the second introduction window 301b into the heat exchange module 300b. According to the operation condition of the fuel cell membrane humidifier, all of the first fluid may be introduced into the humidification module 200b or the heat exchange module 300b. In this case, the cross partition 152b prevents the first fluid from being discharged directly through the first fluid outlet 122b without being introduced into the introduction windows 201b and 301b.

After a first fluid introduced into the humidification module 200b performs moisture exchange while flowing through the inside of the humidification module 200b and a first fluid introduced into the heat exchange module 300b performs heat exchange while flowing through the inside of the heat exchange module 300b, the first fluids are mixed with each other in front of the first fluid outlet 122b, and the mixed fluid is discharged through the first fluid outlet 122b to the outside of the fuel cell membrane humidifier 20b.

Next, the operation processes of the fuel cell membrane humidifiers according to the embodiments of the present disclosure will be described with reference to FIGS. 19 to 21. Each drawing, the drawing located at a left lower part illustrates a case in which the flow control part 400b includes only the bimetal, and the drawing located at a right lower part illustrates a case in which the flow control part 400b includes the bimetal 410 and the opening/closing window 420. Meanwhile, the operation processes of the fuel cell membrane humidifiers according to different embodiments of the present disclosure are substantially the same as the operation process of the fuel cell membrane humidifier according to the first embodiment, so repeated description thereof will be omitted.

Figure 19:
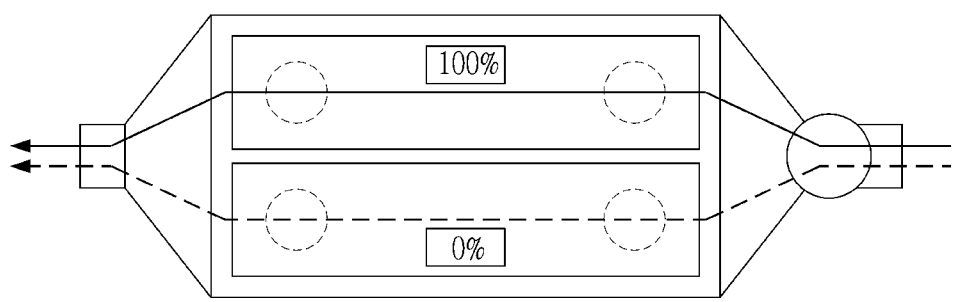
FIGS. 19 to 21 are views for illustrating the operation processes of the fuel cell membrane humidifiers according to the embodiments of the present disclosure.
Figure 19:
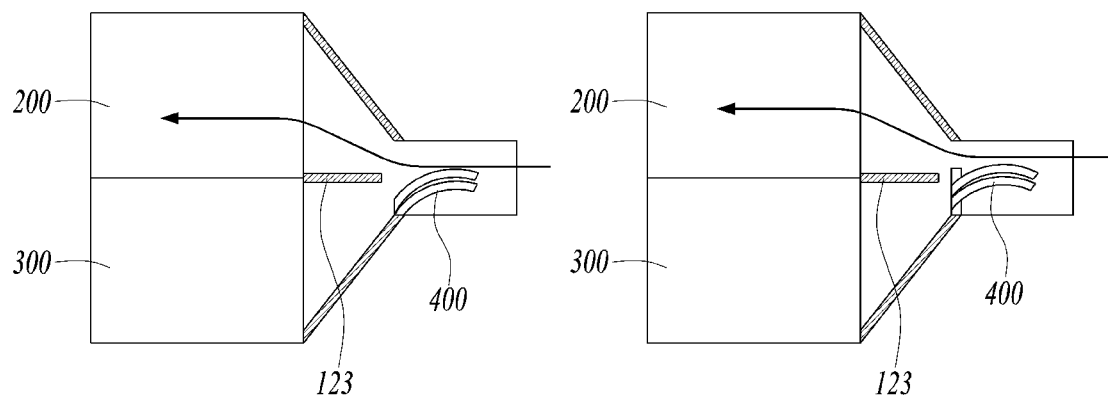

FIG. 19 illustrates an example in which only the function of the humidifier is embodied by introducing a first fluid into only the humidification module 200. In FIG. 19, the output of the fuel cell stack 30 may be a high output, and a first fluid has a relatively high temperature. Accordingly, a metal plate on the side of the humidification module 200 which has a high coefficient of thermal expansion expands faster, and as a result, the flow control part 400 opens a flow path of the side of the humidification module 200 and closes a flow path of the side of the heat exchange module 300. A major portion of dry air (a first fluid) compressed by the air compression means 10 flows into the hollow fiber membranes located inside the humidification module 200 through the housing cap 120 at a first side and is discharged through the first fluid outlet 122 of the housing cap 120 at a second side to the outside of the membrane humidifier. In this process, the first fluid performs moisture exchange with a second fluid introduced through the second fluid inlet 131.

Figure 20:
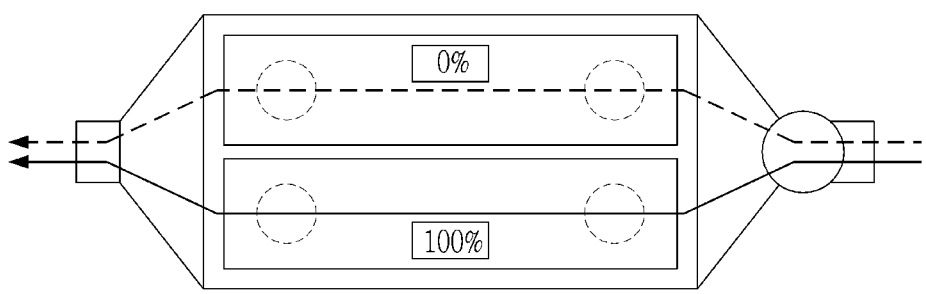
Figure 20:
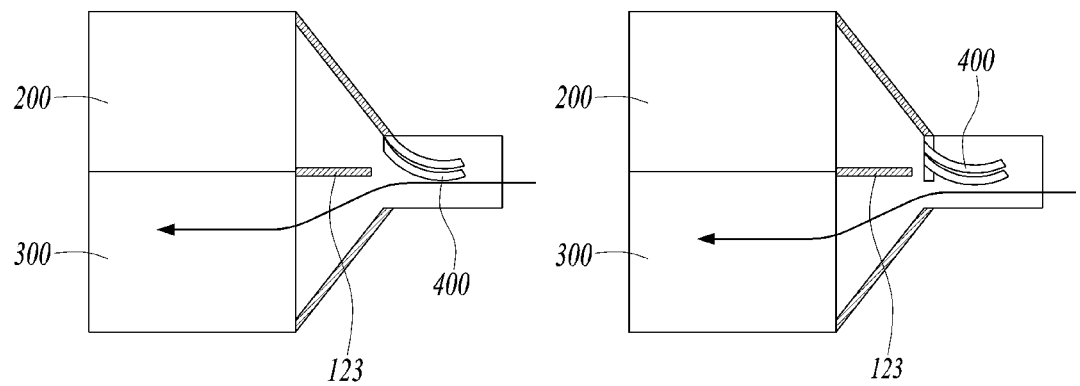

FIG. 20 illustrates an example in which only the function of a heat exchanger is embodied by introducing a first fluid into only the heat exchange module 300. In FIG. 20, the output of the fuel cell stack 30 may be a low output, and a first fluid has a relatively low temperature. Accordingly, a metal plate on the side of the humidification module 200 which has a high coefficient of thermal expansion contracts faster, and as a result, the flow control part 400 opens a flow path on the side of the heat exchange module 300 and closes a flow path on the side of the humidification module 200. A majority of dry air (a first fluid) compressed by the air compression means 10 flows into the heat exchange module 300 and is discharged through the first fluid outlet 122 of the housing cap 120 at the second side to the outside of the membrane humidifier. In this process, moisture exchange between the first fluid and the second fluid is not performed, but only heat exchange between the first fluid and the cooling medium is performed. In this case, by controlling the temperature and amount of the cooling medium introduced into the heat exchange module 300, the temperature of the first fluid which is discharged through the first fluid outlet 122 and introduced into the fuel cell stack 30 can be controlled as desired.

Figure 21:
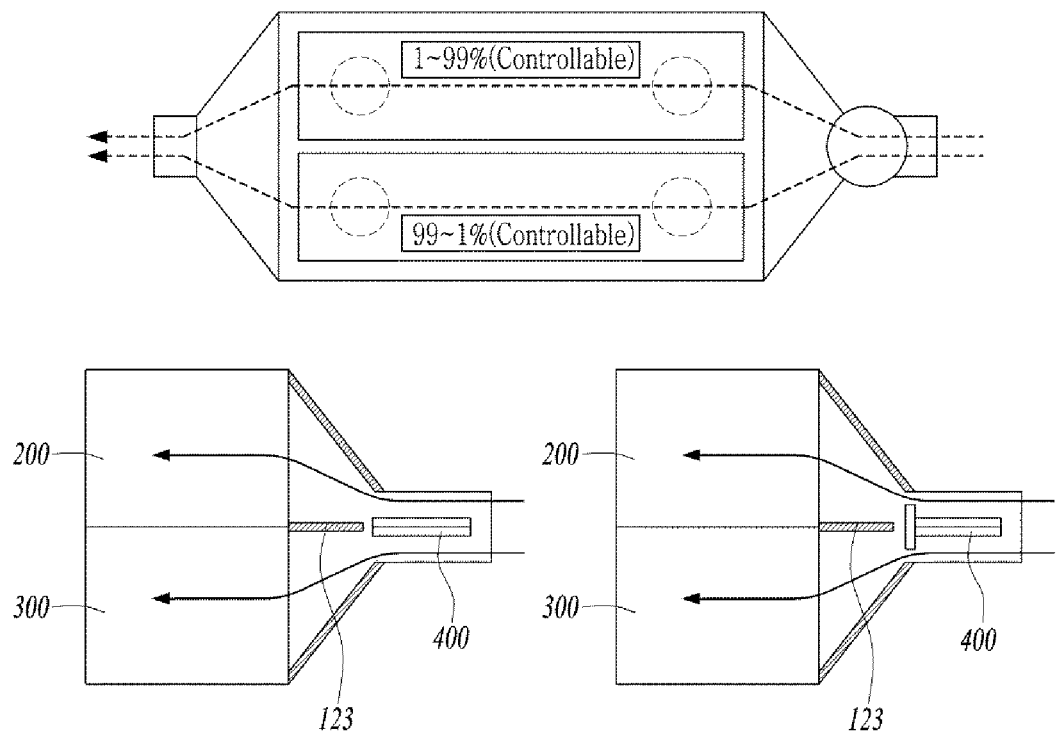

FIG. 21 is an example in which a first fluid is introduced into the humidification module 200 and the heat exchange module 300 so as to embody humidification and heat exchange functions, respectively. FIG. 21 may be a case in which the output of the fuel cell stack 30 is between low and high outputs, and the temperature of the first fluid is between low and high temperatures. Accordingly, the thermal expansion coefficients of two metals constituting the bimetal are somewhat similar to each other, so that the flow path of the humidification module 200 or the flow path of the heat exchange module 300 is partially opened. At least a portion of dry air (a first fluid) compressed by the air compression means 10 flows into the humidification module 200, and the remaining portion thereof flows into the heat exchange module 300 so as to be discharged through the first fluid outlet 122 of the housing cap 120 at the second side to the outside of the membrane humidifier. The first fluid passing through the humidification module 200 and the first fluid passing through the heat exchange module 300 are mixed with each other, and the mixed fluid is discharged through the first fluid outlet 122 to the outside of the membrane humidifier and is introduced into the fuel cell stack 30. In this case, by controlling the temperature and amount of a cooling medium introduced into the heat exchange module 300, the temperature of the mixed first fluid can be controlled. As a result, the humidified state and temperature of the first fluid introduced into the fuel cell stack 30 can be controlled as desired.

Next, another example of the fuel cell system having the fuel cell membrane humidifier according to each of the embodiments of the present disclosure will be described with reference to FIG. 22.

Figure 22:
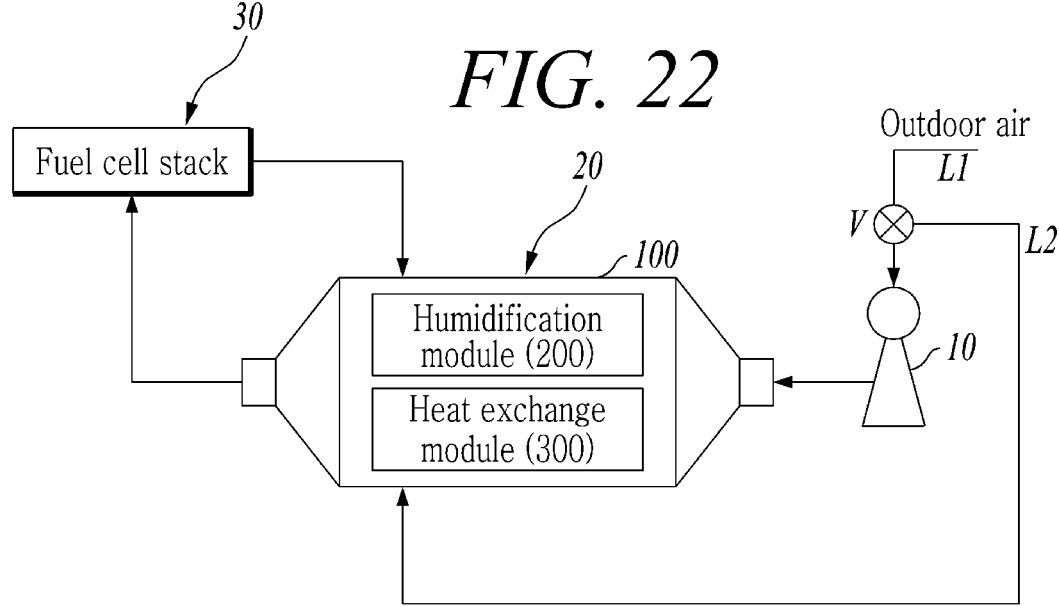
FIG. 22 is a view illustrating another example of the fuel cell system having the fuel cell membrane humidifier according to each of the embodiments of the present disclosure.

As illustrated in FIG. 22, a fuel cell system according to another embodiment of the present disclosure includes the air compression means 10, the fuel cell membrane humidifier 20, the fuel cell stack 30, a bypass flow path L2, and a bypass valve V.

The fuel cell system of the second embodiment is only different from the fuel cell system of the first embodiment described above in that the fuel cell system of the second embodiment includes the bypass flow path L2 and the bypass valve V, and other components of the fuel cell system of the second embodiment are the same as the associated parts of the fuel cell system of the first embodiment, so the detailed description of the air compression means 10, the fuel cell membrane humidifier 20, and the fuel cell stack 30 will be omitted.

The fuel cell system of this embodiment includes the bypass flow path L2 connected to the cooling medium inlet 141 of the heat exchange module 300 by branching from the outdoor air supply path L1 installed at a side above the front of the air compression means 10. The bypass valve V which controls the flow rate of outdoor air to be bypassed is formed on the outdoor air supply path L1.

In the fuel cell system of the first embodiment described above, the heat exchange module 300 cools a first fluid by using a cooling medium supplied from the outside. In this case, to supply the cooling medium, a separate cooling medium storage means is required to be provided, which may limit the simplification and miniaturization of the fuel cell system.

In this embodiment, at least a portion of outdoor air introduced into the air compression means 10 is supplied through the bypass flow path L2 to the heat exchange module 300 so as to cool the first fluid. Accordingly, in the case of an air cooling type heat exchanger, a separate cooling medium storage means for supplying a cooling medium is not required to be provided, so a fuel cell system that is more simplified and miniaturized may be obtained.

In the above, although the embodiments of the present disclosure have been described, those skilled in the relevant technical field may variously modify and change the embodiments of the present disclosure by adding, changing, or deleting components without departing from the spirit of the present disclosure described in the claims, and these modified and changed embodiments are included in the scope of the claims of the present disclosure.

<Description of the Reference Numerals in the Drawings>

| | |
|---|---|
| 10: Air compression means | 20: Fuel cell membrane humidifier |
| 30: Fuel cell stack | 110: Housing body |
| 100: Housing part | 200: Humidification module |
| 120: Housing cap | 400: Flow control part |
| 300: Heat exchange module | 420: Opening/closing window |
| 410: Bimetal | L2: Bypass flow path |
| L1: Outdoor air supply path | |

The invention claimed is:

1. A fuel cell membrane humidifier comprising:
a housing part having a space divided by a partition;
a humidification module formed in a first portion of the divided space and having a plurality of hollow fiber membranes allowing a first fluid flowing thereinside to perform moisture exchange with a second fluid flowing thereoutside;
a heat exchange module formed in a second portion of the divided space and configured to cool the first fluid flowing inside the heat exchange module; and
a flow control part configured to actively control a flow direction of the first fluid according to temperature change of the first fluid according to an output state of a fuel cell stack,
wherein the flow control part is a bimetal composed of a metal plate on a side of the humidification module made of metal having a high coefficient of thermal expansion, and a metal plate on a side of the heat exchange module made of metal having a low coefficient of thermal expansion,
wherein the flow control part further comprises an opening/closing window formed by being fixed to an end part of the bimetal and configured to open and close a flow path of each of the humidification module and the heat exchange module according to change of a shape of the bimetal,
wherein the housing part comprises:
a housing body divided into two spaces by the partition, and
housing caps coupled respectively to opposite ends of the housing body, wherein a first fluid inlet through which the first fluid is introduced and a first fluid outlet through which the first fluid is discharged are formed on the housing caps, respectively,
wherein the housing cap on which the first fluid inlet is formed comprises the flow control part which controls the flow direction of the first fluid, and a cap partition formed in an extending direction of the partition,
wherein the opening/closing window opens and closes the flow path of each of the humidification module and the heat exchange module while moving in the first fluid inlet,
wherein the first fluid whose direction is controlled by the flow control part is guided to the humidification module or the heat exchange module by the cap partition,
wherein the humidification module and the heat exchange module are not in fluid communication in the housing.

2. The humidifier of claim 1, wherein the heat exchange module is a heat exchange module of a shell and tube type, a heat exchange module of a honeycomb type, or a heat exchange module of a plate type.

3. The humidifier of claim 1, wherein the housing part comprises:
  a cooling medium inlet through which a cooling medium is supplied to the heat exchange module, and a cooling medium outlet through which a cooling medium which has performed cooling is discharged,
  wherein the cooling medium inlet is connected to a bypass flow path which bypasses at east a portion of outdoor air to be introduced into an air compression means.

* * * * *